June 2, 1936.　　M. J. MARTY ET AL　　2,043,054
INDICATOR AND CONTROL FOR AUTOMOBILE HEATERS
Original Filed Dec. 7, 1934
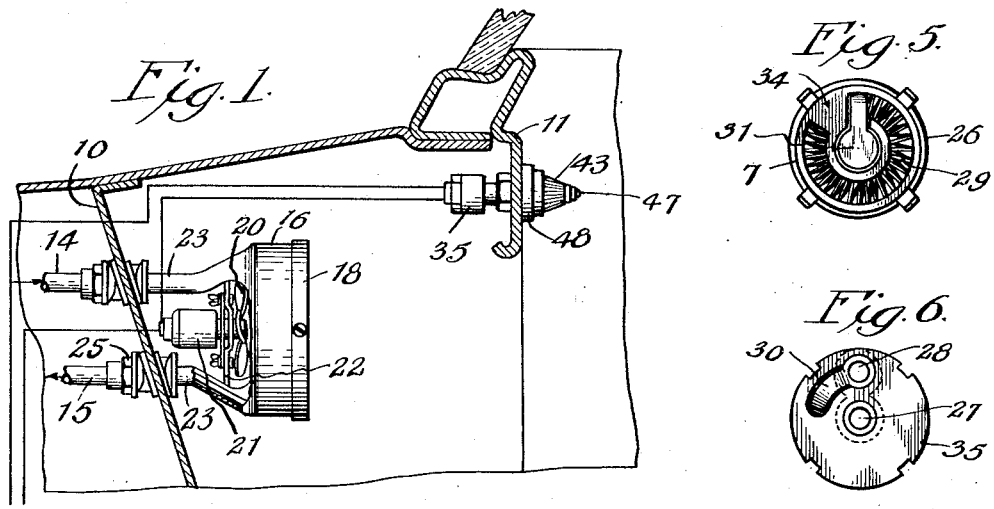
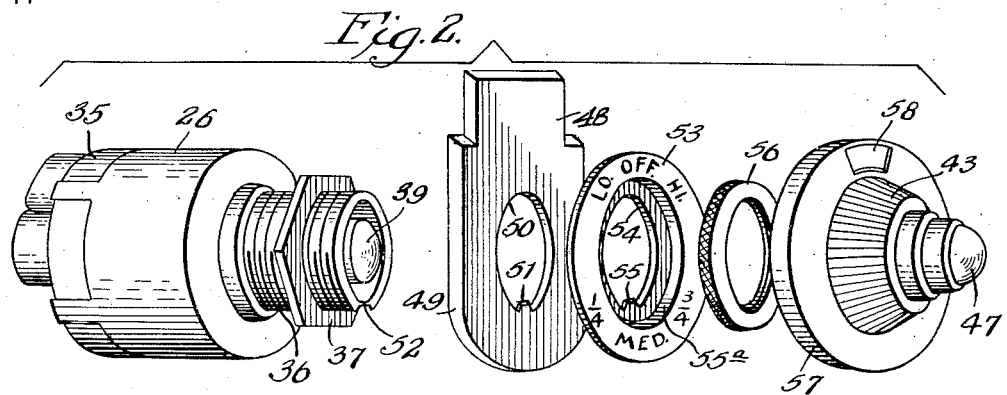
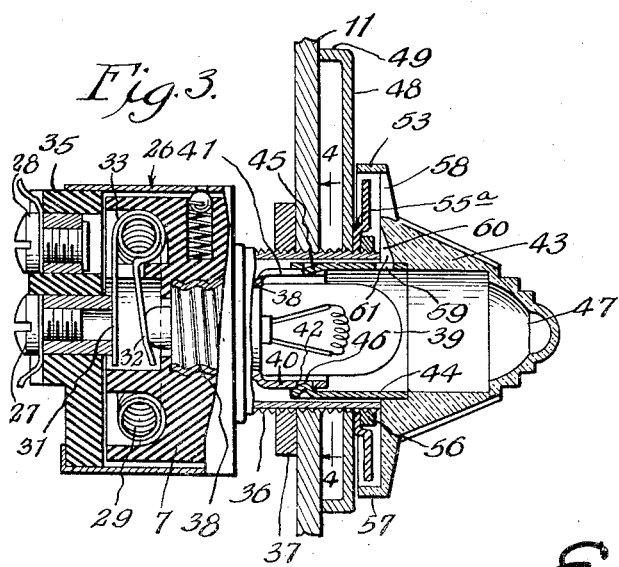
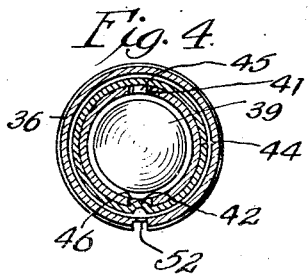
Inventors.
MATHEW J. MARTY &
RICHARD HAUSSE
By E. K. Lundy, Atty.

Patented June 2, 1936

2,043,054

UNITED STATES PATENT OFFICE 2,043,054

INDICATOR AND CONTROL FOR AUTOMOBILE HEATERS

Mathew J. Marty and Richard H. Hausse, Chicago, Ill.

Original application December 7, 1934, Serial No. 756,423. Divided and this application February 28, 1935, Serial No. 8,712

7 Claims. (Cl. 177—311)

This invention relates broadly to heaters for the interiors of closed automobiles, the heater preferably being the type which utilizes the hot fluid that is circulated in the engine cooling system, and more particularly this invention relates to means for controlling and indicating the speed of the motor actuated means for circulating air through the heater.

This application is a division of our prior pending application for Letters Patent for an "Automobile heater", Serial No. 756,423.

Heaters of the type mentioned usually shunt the hot fluid or hot water from the engine cooling system to a small radiator located within the passenger compartment and it is customary to warm the air in the compartment by blowing or circulating it by a fan through the air spaces in the radiator. The fan, for convenience, is usually one that is driven by an electric motor which is connected with the electric battery with which the vehicle is equipped.

In heaters of this character it is desirable to regulate the volume or speed of the air that is driven through the heater radiator by the fan, and in the present structure provision is made to control and adjust the speed of the fan as well as to visually indicate to the occupant of the vehicle the speed at which such fan is operating.

The indicator or dial devised for this purpose is illuminated whenever the fan is running and the knob for moving the controller is also illuminated so that the occupant of the vehicle may readily ascertain whether the fan is operating and at what speed. The illumination of the controller knob or the dial is desirable because of the fact that persons frequently depart from a vehicle and inadvertently leave the fan operating which, of course, consumes electric current at times when the heater is not needed and during a period when electricity is not being charged into the battery in the same manner as when the vehicle is moving.

Numerous objects and advantages are in mind in devising the present structure, among which may be mentioned the provision of a control device that is novel and simple in construction; is capable of being readily installed upon practically any type or shape of instrument panel, and is adapted for use in conjunction with a heater already in use; is dependable in operation; is made of sturdy parts so that it will withstand severe usage; and which is economical to manufacture so that it may be sold to the user for a reasonable retail price.

The foregoing and other objects are accomplished and the invention is practiced in substantially the manner hereinafter fully described, reference being made to the accompanying drawing that forms a part of this specification and which shows a typical or preferred embodiment of the automobile heater and the mounting and control device.

In the drawing:—

Figure 1 is a graphic view, in elevation, showing the heater and the control devices installed in an automobile.

Figure 2 is a view in perspective showing the parts of the control devices separated in the order of assembly.

Figure 3 is a vertical axial section of control devices mounted on the instrument panel and drawn to an enlarged scale.

Figure 4 is a transverse vertical section on line 4—4 in Figure 3.

Figure 5 is a plan of the main body portion of the switch drawn smaller than Fig. 3 showing the movable parts within the housing.

Figure 6 is a plan of the inner face of the stationary closure disk that carries the terminal.

In the drawing the dash board is shown at 10, the instrument board is indicated by the numeral 11, and the cowl is represented at 12.

The heater comprises a cellular body 13 that circulates the hot fluid from the engine cooling system and also permits air to be blown between the radiator coils for the purpose of taking up such heat and distributing the warmed air in the car body. The radiator receives the hot fluid through an inlet or feed pipe 14 and returns the hot fluid to the cooling system through an outlet or return pipe 15. The radiator is surrounded by a metal casing 16 that conforms generally to the shape of the radiator and the front of the casing facing into the vehicle is closed by a front plate 18 in which one or more hinged doors 19 are provided so that the front of the casing may be opened to permit discharge of the warm air in desirable directions. The rear of the casing is open to receive the fan 20 which is mounted upon the shaft or spindle of a small electric motor 21 interposed in a circuit formed by conductors $x$ that receive current from the electric storage battery with which the vehicle is equipped. The motor is mounted upon a bridge bar 22 extending across the rear of the casing between the motor and the fan, which bridge bar is provided with an opening through which the motor spindle passes.

The rear of the casing 16 is provided with upper and lower tubular housings 23 that surround pipes 14 and 15 to within a short distance of the ends of the latter.

The housings 23 are threaded and pass through openings in the dash-board 10 so that the heater may be mounted in a desirable position on the dash board by nuts 25 that screw onto the housings upon opposite sides of the dash board 10, and these are suitable rocker members and washers between faces of the dash board and said nuts. These rocker members and washers form the subject-matter of the above-mentioned prior pending application for Letters Patent, Serial No. 756,423, from which the present subject-matter has been divided.

It is desirable to control the flow of warm air through the coils of the radiator, and a portion of this control is accomplished by means of the movable doors at the front of the radiator casing. A further control is accomplished by regulating the speed of the fan through the medium of a simple control device carried on the instrument panel where it is within easy reach of the occupant of the vehicle. The electrical elements of the control structure is enclosed, within a housing 35 preferably of insulating material and consists of a coil of resistance wire interposed in the circuit leading to the motor and there are means for cutting different lengths of the resistance coil to diminish or increase the amount of current supplied to the motor, thereby reducing or increasing its speed and consequently the quantity of air blown by the fan.

Provision is also made for passing electric current through an illuminating lamp at the same time the current is switched on or cut into the resistance coil. The resistance structure above defined is not part of the present invention and may be readily purchased as a unit in the open market and is therefore not shown in detail herein.

The insulating housing 35 is provided with a tubular metal stub 36 that is exteriorly screw threaded and has a lock nut 37 screwed thereon. Within the stub there is a socket element 38 that is rotatably mounted and carries a miniature electric lamp or bulb 39, said socket being interposed in the circuit from the battery. The rotatable socket 38 has an unthreaded outer portion or sleeve 40 that is provided with an open ended longitudinal slot or keyway 41 and opposite the slot there is an aperture 42 in said sleeve.

The means for rotating the socket, and thereby lighting the lamp and operating the controller within the housing 35 consists of a hand grasp or button 43 that has a tube 44 imbedded in its inner back portion and projects therefrom into the tubular stub 36. The stub 44 has inside and outside diameters that permits its end portion farthest from the button being inserted inside the threaded stub 36 and telescoped over the sleeve 40 of the socket 38. A punched-in lug or key 45 on the tube 44 enters the slot or key-way 41 of the socket sleeve and an inwardly disposed embossment or knob 46 on the opposite wall of tube 44 enters the aperture 42. Thus the hand button is removably or detachably mounted so that rotation of the button will turn the socket and consequently the controller device in the housing 35.

The button 43 is made of an insulating material that is preferably translucent and the portion of the wall of the button, aligning with the end of tube 44, is hollowed out as at 47 to reduce the thickness of its wall and permit light rays from the bulb 39 to be emitted through it so as to indicate that the lamp is lit and that the circuit is turned on to the fan motor.

The manner of mounting the above described structure upon the instrument board or panel comprises an escutcheon plate 48 that may be of any suitable shape and is preferably provided with lateral flanges 49 around its outer edge. The plate has a central opening 50 of such diameter that it may be inserted over the control stub 36 and be positioned in engagement with the center surface of the instrument board or panel. A small tongue 51 extends into the opening 50 and enters a longitudinal groove 52 formed in the lower portion of the stub 36 so that the escutcheon plate is retained against rotation. The instrument board or panel is provided with an opening through which a portion of the threaded stub 36 of the control is inserted and after the escutcheon is mounted on the front face of the board or panel, the nut 37 is screwed up until it contacts the rear face of the panel.

The indicator dial is a metal disk 53 having a central opening 54 and a positioning tongue 55, and the portion of the disk that surrounds the opening is dished or cupped rearwardly as shown at 55$^a$. The dial disk 53 is inserted on the stub 36 in front of the escutcheon 48 and a threaded annular bezel or ring 56 is screwed onto the end of the stub 36 until it seats in the dished or recessed portion 55 in the dial disk. This will hold the escutcheon 48 and the dial disk 53 against the front face of the panel. Thereafter the nut 37 may be tightened with a wrench against the opposite face of said board or panel to securely clamp the parts in assembly.

The control button 43 is provided with a cylindrical annular flange 57 of such diameter that the hollow space within such cylindrical portion will fit over and surround the dial 53, while the edge of the flange will be disposed close to the escutcheon 48. A window or sight opening 58 is made in a convenient portion of the wall of the button so that indicia on the face of the dial may be read by the occupant. In order to illuminate the dial to permit the indicia to be readily observed, a hole 59 is made in the tube 44 and a light deflector or reflector surface 60 is provided by forming an oblique irregular shaped niche 61 in the body of the button aligning with and above the hole 59.

Since the lamp or bulb 39 is close to the aperture 59, light rays from the bulb will pass through said aperture and will be deflected by the oblique surface 60 to the dial which is thereby illuminated so that the indicia may be read through the window 58.

The switch consists of a 2-part structure, detailed in Figs. 3, 5 and 6, the outer part of insulating material, forming the disk shaped closure 35 of the metal shell 26 is provided with terminals 27 and 28, while the inner part is a rotatable cylindrical block 7 having a central bore in which the inner end of the threaded lamp socket 38 is anchored. A resistance coil 29 is seated in a segmental groove or channel in the face of the block 7 nearest the closure disk and, when the block is rotated, the convolutions of said coil successively engage a bowed spring controller contact 30 secured to the inner end of terminal 28. The central terminal 27 is engaged by an arm 31 of a double-leaf spring contact that has its other arm 32 yieldably engaged with the axial terminal of the lamp, while the intermediate portion 33 of said spring contact encircles several convolutions at an end of the resistance coil as seen in Fig. 3. When the dial indicates that the switch is "off", the bowed portion of contact 30 will be at rest upon the plane surface 34 of the insulation block 7 between the ends of the coil so that the circuit through the coil, motor, and lamp is opened.

When the button or knob is turned clockwise and revolves the rotatable block 7 the bowed contact 30 will be engaged by a portion of the leaf spring contact and then by convolutions of the coil to light the lamp and energize the circuit through the motor. The farther around the button is turned the more resistance is cut-in thus reducing the speed of the motor, and so long as the motor is running the lamp remains lighted but it is extinguished as soon as the motor is cut off.

By means of the structure just described, the operator or occupant of the vehicle is visually notified at all times as to whether the fan motor is switched on or off and may readily ascertain the speed at which the motor and fan is rotating. It will be understood, however, that the button need not be a rotatable element but may be a stationary shield or guard and in lieu thereof the dial may be manually operated and connected to the socket sleeve 38 to switch on the lamp and operate the control.

Modifications of the structure herein shown may be made without departing from the principles involved, and it should be understod that the drawing and the within description are given for the purpose of clearness of understanding only and that no unnecesary limitations are to be undertood therefrom.

We claim:

1. A device of the kind described comprising a support having an aperture, a stationary housing on one side of said support, a threaded stub projecting from said housing through said aperture, means for anchoring said housing and stub to said support, an electric switch structure within said housing having a rotatable body, a socket secured to said body, a lamp in said socket, and projecting into said stub, a rotatable hand grasp on the side of said support opposite said housing and provided with a sight aperture, a sleeve connecting said hand grasp to said socket for rotating the latter, a dial between said hand grasp and support, and means for clamping said dial against said support.

2. A device of the kind described comprising a support having an aperture, a stationary housing on one side of said support, a threaded stub projecting from said housing through said aperture, means for anchoring said housing and stub to said support, an electric switch structure within said housing having a rotatable body, a socket secured to said body, a lamp in said socket and projecting into said stub, a rotatable hand grasp on the side of said support opposite said housing and provided with a sight aperture, a sleeve connecting said hand grasp to said socket for rotating the latter and provided with a light opening, a dial between said hand grasp and support, and means for clamping said dial against said support.

3. A device of the kind described comprising a support having an aperture, a stationary housing on one side of said support, a threaded stub projecting from said housing through said aperture, means for anchoring said housing and stub to said support, an electric switch structure within said housing having a rotatable body, a socket secured to said body, a lamp in said socket and projecting into said stub, a rotatable hand grasp on the side of said support opposite said housing and provided with a sight aperture, a sleeve connecting said hand grasp to said socket for rotating the latter, a dial between said hand grasp and support, and a bezel coacting with the protruding portion of said stub for clamping said dial against said support.

4. A device of the kind described comprising a support having an aperture, a stationary housing on one side of said support, a threaded stub projecting from said housing through said aperture, means for anchoring said housing and stub to said support, an electric switch structure within said housing having a rotatable body, a socket rotatable with said body, a lamp in said socket extending into said stub, a rotatable sleeve connected to said socket and protruding through said support and having a light aperture, a stationary dial secured to said support and illuminated by light rays emitted through said light aperture, and an operating handle secured to said sleeve and having a sight aperture through which indicia on the dial may be observed.

5. A device of the kind described comprising a support having an aperture, a stationary housing on one side of said support, a threaded stub projecting from said housing through said aperture, means for anchoring said housing and stub to said support, an electric switch structure within said housing having a rotatable body, a socket rotatable with said body, a lamp in said socket extending into said stub, a rotatable sleeve connected to said socket and protruding through said support and having a light aperture, a stationary dial secured to said support and illuminated by light rays emitted through said light aperture, an operating handle secured to the protruding portion of said sleeve, and a flange projecting laterally from said handle in front of said dial and having a sight opening through which indicia on the dial may be observed.

6. A device of the kind described comprising a support having an aperture, a stationary housing on one side of said support, a threaded stub projecting from said housing through said aperture, means for anchoring said housing and stub to said support, an electric switch structure within said housing having a rotatable body, a socket rotatable with said body, a lamp in said socket extending into said stub, a rotatable sleeve connected to said socket and protruding through said support and having a light aperture, a stationary dial secured to said support and illuminated by light rays emitted through said light aperture, an operating handle closing the protruding end of said sleeve, and an annular flange projecting laterally from said handle and obscuring said dial, said flange having a sight opening through which indicia on the dial may be observed.

7. A device of the kind described comprising a support having an aperture, a stationary housing on one side of said support, a threaded stub projecting from said housing through said aperture, means for anchoring said housing and stub to said support, an electric switch structure within said housing having a rotatable body, a socket rotatable with said body, a lamp in said socket extending into said stub, a rotatable sleeve connected to said socket and protruding through said support and having a light aperture, a stationary dial secured to said support and illuminated by light rays emitted through said light aperture, an operating handle closing the protruding end of said sleeve and having an annular flange obscuring said dial, said flange provided with a sight opening radially alined with said light aperture and through which the indicia illuminated by light rays emitted through said light aperture may be observed.

MATHEW J. MARTY.
RICHARD H. HAUSSE.